US005576530A

United States Patent [19]
Hagerty

[11] Patent Number: 5,576,530
[45] Date of Patent: Nov. 19, 1996

[54] PORTABLE DATA TERMINAL INCLUDING A SCANNING HEAD THAT IS SECURED TO THE TERMINAL IN A MANNER THAT ALLOWS THE SCANNING HEAD TO BE POSITIONED IN OPPOSITE ORIENTATIONS

[75] Inventor: Joseph J. Hagerty, Ortonville, Mich.

[73] Assignee: Universal Data Incorporated, Clarkston, Mich.

[21] Appl. No.: 439,359

[22] Filed: May 11, 1995

[51] Int. Cl.$^6$ .................................................. G06K 7/10
[52] U.S. Cl. .......................... 235/472; 235/462; 235/473; 439/218; 439/929
[58] Field of Search ...................... 235/472, 462, 235/473; 364/708.1; 354/145.1; 439/218, 222, 224, 344, 929

[56] References Cited

U.S. PATENT DOCUMENTS

| | | | |
|---|---|---|---|
| 4,431,245 | 2/1984 | Jigamian et al. | 439/344 |
| 4,621,189 | 11/1986 | Kumar et al. | 235/472 |
| 4,983,818 | 1/1991 | Knowles | 235/472 |
| 5,059,778 | 10/1991 | Zouzoulas et al. | 235/472 |
| 5,089,834 | 2/1992 | Nakasa et al. | 354/145.1 |
| 5,115,120 | 5/1992 | Eastman | 235/472 X |
| 5,149,950 | 9/1992 | Swartz et al. | 235/472 |
| 5,250,792 | 10/1993 | Swartz et al. | 235/472 |
| 5,262,628 | 11/1993 | Shepard et al. | 235/472 |
| 5,284,450 | 2/1994 | Fukino et al. | 439/929 X |
| 5,306,900 | 4/1994 | Metlitsky et al. | 235/462 |
| 5,332,892 | 7/1994 | Li et al. | 235/462 |
| 5,349,497 | 9/1994 | Hanson et al. | 235/472 X |
| 5,367,151 | 11/1994 | Dvorkis et al. | 235/472 |
| 5,367,152 | 11/1994 | Krichever et al. | 235/472 |
| 5,371,348 | 12/1994 | Kumar et al. | 235/472 |
| 5,396,054 | 3/1995 | Krichever et al. | 235/462 |
| 5,396,055 | 3/1995 | Shepard et al. | 235/472 |
| 5,410,141 | 4/1995 | Koenck et al. | 235/472 |
| 5,471,042 | 11/1995 | Kirkeby et al. | 235/472 |
| 5,479,002 | 12/1995 | Heiman et al. | 235/472 |

FOREIGN PATENT DOCUMENTS

| | | |
|---|---|---|
| 2144681 | 6/1990 | Japan. |
| 4149790 | 5/1992 | Japan. |

OTHER PUBLICATIONS

PDT 3100/PDT 3110 Brochure, p. 27, author missing, month & year missing.

*Primary Examiner*—Donald T. Hajec
*Assistant Examiner*—Michael G. Lee
*Attorney, Agent, or Firm*—Harness, Dickey & Pierce, P.L.C.

[57] ABSTRACT

A portable, hand-held data terminal for scanning and reading a bar code that includes a removable scanning head that can be secured to the terminal in one orientation for right-handed operation, and can be removed and secured to the terminal in an opposite orientation for left-handed operation. The scanning head includes a bottom panel having a tab and slot structure, and the terminal includes a top panel having a tab and slot structure. The positions of the slots of the top panel structure allow the tabs of the scanning head structure to be inserted between and then under the tabs of the top panel structure in a locked configuration.

17 Claims, 3 Drawing Sheets

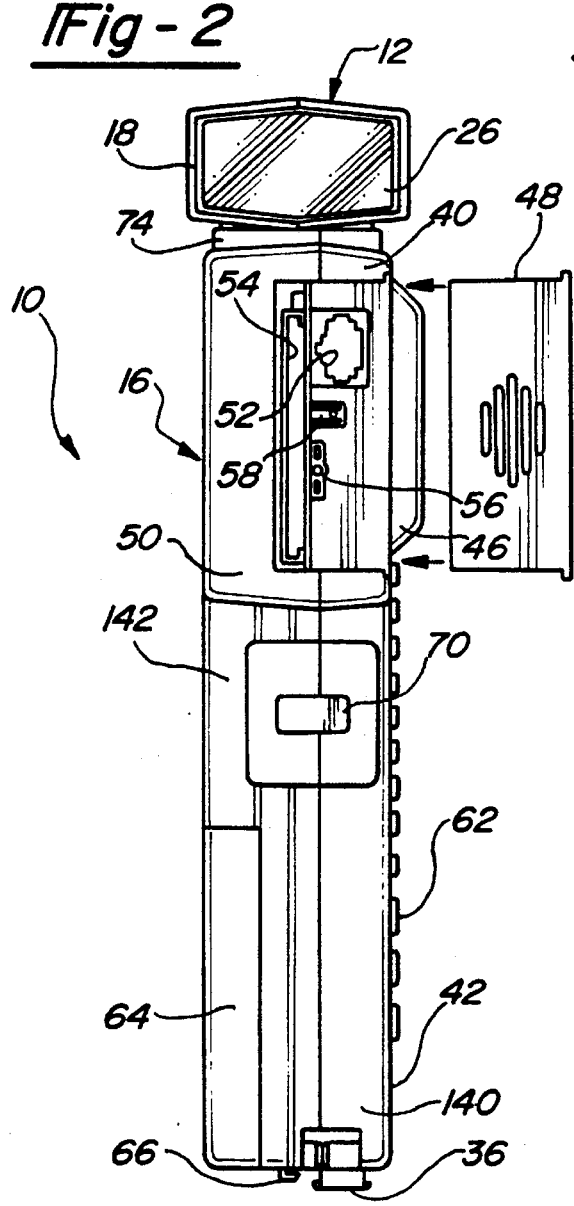
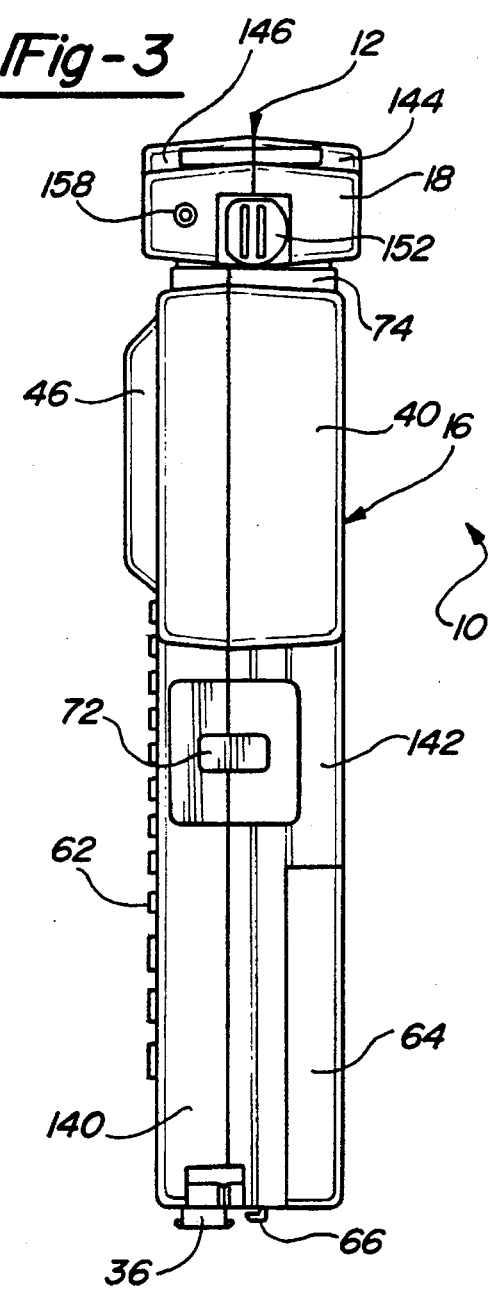
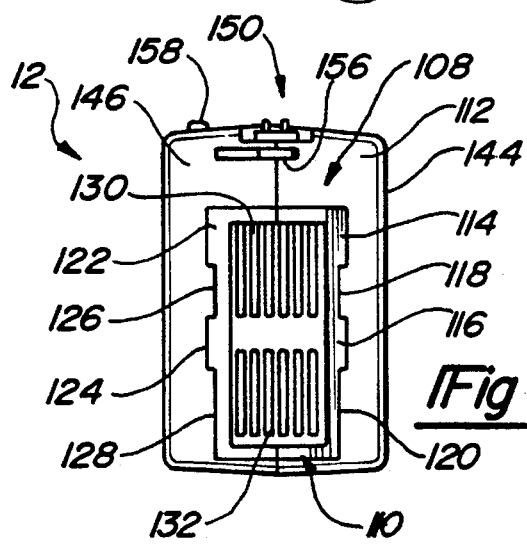
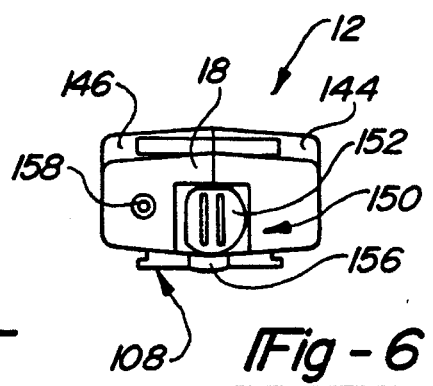

PORTABLE DATA TERMINAL INCLUDING A SCANNING HEAD THAT IS SECURED TO THE TERMINAL IN A MANNER THAT ALLOWS THE SCANNING HEAD TO BE POSITIONED IN OPPOSITE ORIENTATIONS

BACKGROUND OF THE INVENTION

1. Field of the Invention

This invention relates generally to a portable data scanning terminal and, more particularly, to a hand-held, portable bar code scanning terminal for collecting data scanned from a bar code where the terminal includes a removable and rotatable scanning head to allow for left-handed and right-handed operation.

2. Discussion of the Related Art

Portable, hand-held laser scanners that scan and read light reflective bar codes and other reflective indicia positioned on various types of merchandise and the like are widely available. Many bar code readers of this type usually include a laser scanning unit that is mounted on or within a reader housing, or connected to the reader by a suitable wire connection. The scanning unit includes a laser source, such as a laser diode, that generates a laser beam, and associated optics to focus and direct the laser beam. A reflected beam from the bar code is received by a photodetector associated with the scanning unit so that reflected light intensity patterns can be deciphered. Electrical signals generated by the photodetector that are representative of the light intensity pattern are then processed by processing systems within the reader in a manner that is well understood in the art. The bar code reader is generally equipped with a key pad and display screen so that an operator of the reader can input information, such as quantity of a particular item, and processed information by the reader can be displayed on the display screen.

Many current bar code readers incorporate a compact scanning head or scanning unit secured to the reader. One specific bar code reader of this type is referred to as the PDT 3100 or PDT 3110 available from Symbol Technologies, Inc. of Bohemia, N.Y. By incorporating the entire reader into a single unit, one of the operator's hands is free to operate the key pads while the other hand activates a triggering switch for activating the laser beam for scanning. It has heretofore thought to be desirable to incorporate a scanning unit that can be switched to opposite orientations so as to allow left-handed and right-handed operators to activate the reader while at the same time effectively operating the key pads. In other words, by orienting the scanning unit in a right-handed direction, the right-handed operator can operate the reader and have easy access to the key pads with his left hand. Likewise, by orienting the scanning unit in an opposite direction, the left-handed operator can operate the reader and have easy access to the key pad with his right hand.

U.S. Pat. No. 5,306,900 issued to Metlitsky et al. and U.S. Pat. No. 5,367,152 issued to Krichener et al. both disclose a hand-held bar code scanner that includes a scanning structure mounted on a housing of the scanner that is movable to accommodate both right and left-handed operators. A top wall of the housing is removable and rotatable 180° such that a mirror and associated window of the structure will emit and receive the laser beam from opposite directions. Different mechanisms are disclosed for securing the top wall to the housing.

Although the prior art hand-held bar code readers that incorporate a reversible scanning unit have been at least somewhat successful in meeting the desires of the industry, there is still room for improvement of these types of readers. It is therefore an object of the present invention to improve upon known hand-held bar code readers that incorporate a reversible scanning head.

SUMMARY OF THE INVENTION

In accordance with the teachings of the present invention, a portable hand-held data terminal for scanning and reading bar codes is disclosed that includes a removable scanning head that can be secured to the terminal in one orientation for right-handed operation, and can be readily removed and secured to the terminal in an opposite orientation for left-handed operation. The scanning head includes a securing structure on a bottom panel of the scanning head that includes a specially designed tab and slot configuration. A top housing panel of the terminal also includes a securing structure having an accommodating tab and slot configuration. The tab and slot configuration of both the scanning head and the top panel of the terminal are designed to allow reversible operation of the scanning head for both a right-handed and a left-handed orientation. In one embodiment, the positions of the slots of the top panel securing structure allow the tabs of the scanning head securing structure to be inserted between and then under the tabs of the top panel securing structure in a locked configuration in opposite left and right orientations.

Additional objects, advantages, and features of the present invention will become apparent from the following description and appended claims, taken in conjunction with accompanying drawings.

BRIEF DESCRIPTION OF THE DRAWINGS

FIG. 2 is a left side, plan view of the data terminal of FIG. 1 where the scanning head is oriented for right-handed operation;

FIG. 3 is a right side, plan view of the data terminal of FIG. 1 where the scanning head is oriented for right-handed operation;

FIG. 5 is a bottom plan view of the scanning head separated from the data terminal of FIG. 1;

FIG. 6 is an end plan view of the scanning head of the data terminal of FIG. 1 showing a locking mechanism according to an embodiment of the present invention;

DETAILED DESCRIPTION OF THE PREFERRED EMBODIMENTS

The following discussion of the preferred embodiments directed to a hand-held, portable data terminal having a removable and rotatable scanning head is merely exemplary in nature, and is in no way intended to limit the invention or its applications or uses.

Figure 1:
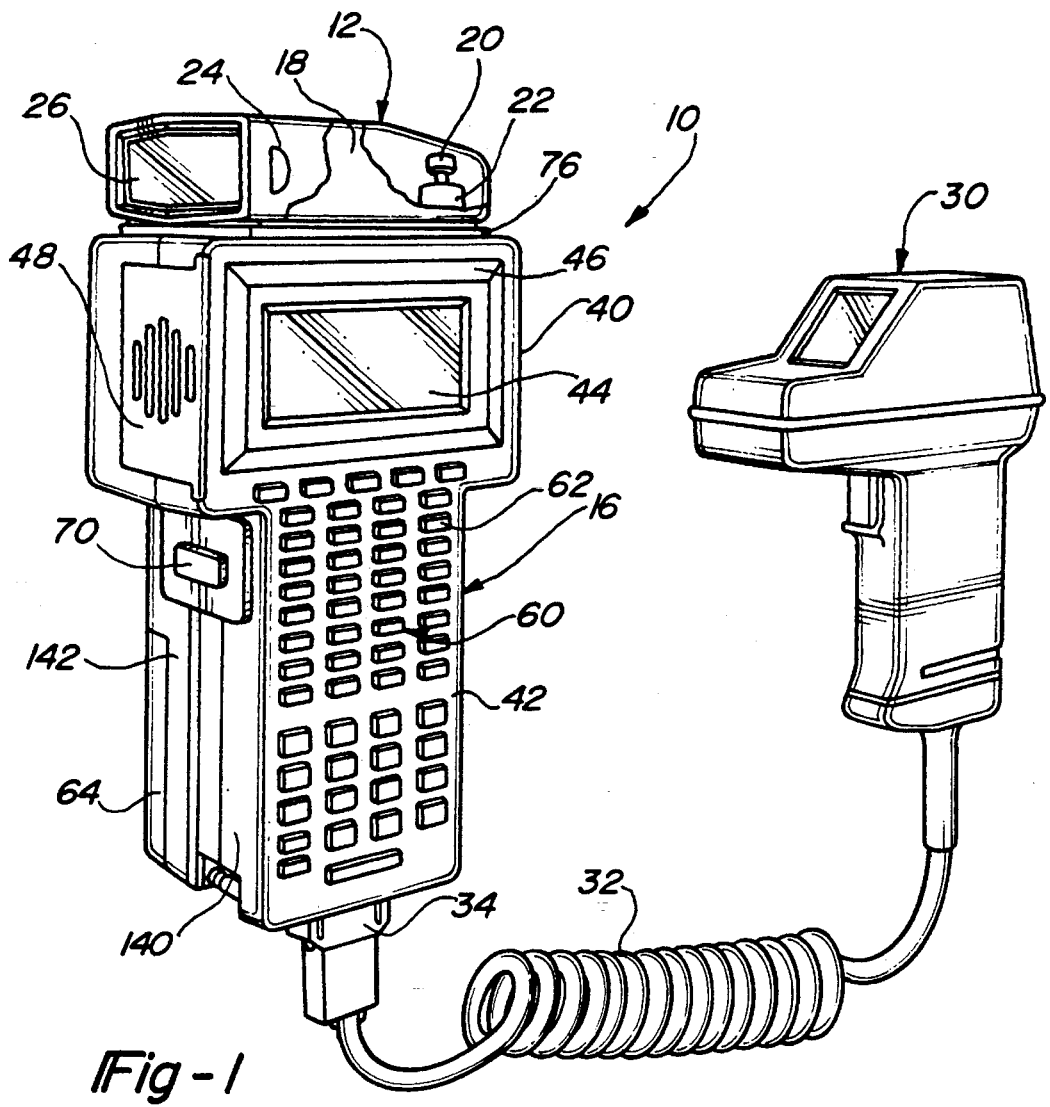
FIG. 1 is a perspective view of a portable data terminal including a removable and rotatable scanning head, and an attached scanning unit, according to an embodiment of the present invention.

First turning to FIG. 1, a perspective view of a portable data terminal 10 for reading bar codes and other reflective data storing indicia is shown according to an embodiment of the present invention. The data terminal 10 includes a scanning head 12 removably secured to a top panel 14 (see FIG. 4) of a data terminal housing 16. The scanning head 12 includes a specially configured housing 18 that conforms to the shape of the housing 16. The housing 18 of the scanning head 12 is broken away to show a number of scanning components. These components include a laser diode 20 mounted on a scanning device 22. The scanning device 22 causes the laser diode 22 to oscillate so as to scan a laser beam generated by the laser diode 22. A photodetector 24 is positioned within the housing 18 for receiving reflected laser beam signals from data storing indicia (not shown) such as a bar code. Other associated circuitry (not shown) for converting light intensity signals from the photodetector 24 to an appropriate electrical signal for data processing would also be included. The configuration of the scanning components within the scanning head 12 are known components for the purposes described herein. A translucent window 26 at one end of the housing 18 allows the laser beam from the laser diode 20 to be emitted from the scanning unit 12, and a reflected light beam to impinge the photodetector 24. As will be discussed in specific detail below, the scanning head 12 is removable from the terminal housing 16 and reattachable in an opposite orientation to allow for left-handed and right-handed operation.

The hand-held, portable data terminal 10 is electrically connected to a scanning unit 30 by a cord 32. The scanning unit 30 can be any type of scanning unit known in the art such as a long range or medium range scanning unit. The cord 32 includes a connector 34 that is connected to an electrical port 36 (see FIG. 2) associated within the housing 16. In one embodiment, the port 36 is a 9-pin subminiature "D" scanner port known in the art. The scanning unit 30 includes similar scanning components to that of the scanning head 12. The terminal 10 is capable of accommodating both the scanning head 12 and the scanning unit 30 simultaneously for different ranges of scanning. The specific scanning unit 30 as shown in FIG. 1 is commercially available from Symbol Technologies, Inc.

FIG. 2 shows a left side, plan view and FIG. 3 shows a right side, plan view of the data terminal 10 with the scanning unit 30 disconnected. The terminal housing 16 is separated into an upper wide portion 40, and a lower narrower portion 42. A display screen 44 positioned in a front panel 46 at the upper portion 40 is provided for displaying processed data during operation of the terminal 10. In one embodiment, the display 44 is an 8 line×21 character-supertwist LED backlit LCD display having a 64×128 DOT graphic capability. A slidably removable door 48 is slidably removable from a left side panel 50 of the upper portion 40. When the door 48 is removed, certain terminal components are accessible in the interior of the housing 16. Particularly, an 8-PIN, RJ-45 female phone connector 52 acting as an RS-232 input connector for downloading data is available. Additionally, a PCMCIA slot 54 is provided that accepts a PCMCIA type 1 and 2 data card (not shown). The data cards store data and other programming information for different applications of the terminal 10 as is understood in the art. Further, a battery charging jack 56 and a charge indicator light 58 are provided for battery charging purposes.

A keyboard 60 including a plurality of key pads 62 is positioned below the display 44 in the front panel 46 at the lower portion 42. The key board 60 is a 55 key alphanumeric, sealed elastomoner keyboard that allows input into the terminal 10 by an operator. A 6-volt rechargeable NI-CAD battery pack 64 is secured to a back surface of the housing 16. The battery pack 64 can be charged while attached to the terminal 10 through the charging jack 56. A battery pack release button 66 allows the battery pack 64 to be released from the housing 16 so the battery pack 64 can be charged separate from the terminal 10 and/or the battery pack 64 can be replaced with other battery packs. The data terminal 10 can be run by a microprocessor NEC V25+, enhanced 80C86PC (not shown). All of the different data terminal components discussed above, except for the scanning head 12, are known in the art as the UDI 300 available from Universal Data, Inc. of Clarkston, Mich. Consequently, the operation of the terminal 10 is also known. As will be discussed in detail below, the scanning head 12 is a new feature added to the UDI 300.

The scanning head 12 is situated for right-handed operation in FIGS. 1–3 in that an operator will grab the lower portion 42 with his right hand such that the window 26 is facing away from the operator, and the key board 60 will be readily accessible to the operator's left hand. Reversal of the scanning head 12 so that the window 26 is facing in an opposite direction will allow a left-handed operator to grab the lower portion 42 with his left hand such that the window 26 is facing away from the operator, and the key board 60 will be readily accessible to the operator's right hand.

The terminal 10 includes a right-handed laser trigger 70 and a left-handed laser trigger 72 both used to activate the laser diode 20 for right-handed and left-handed operation. The microprocessor within the terminal 10 is user programmable to allow the operator to program the microprocessor to only allow one or the other of the right-handed trigger 70 or the left-handed trigger 72 to activate the scanning head 12 depending on the operator's preference. For example, a right-handed operator can selectively program the microprocessor to only allow the right-handed trigger 70 to activate the scanning head 12 so that the operator can activate the scanning head 12 with his index finger. Or, the right-handed operator can selectively program the microprocessor to only allow the left-handed trigger 72 to activate the scanning head 12 so that the operator can activate the scanning head 12 with his thumb. Likewise, a left-handed operator can selectively program the microprocessor to only allow activation of the scanning head 12 by the right-handed or left-handed trigger 70 or 72 depending on whether the left-handed operator wishes to activate the scanning head 12 by his index finger or thumb. This feature is a safety feature in that the terminal 10 prevents inadvertent activation of the laser diode 20 by the opposite trigger 70 or 72.

FIGS. 4–8 depict a number of views of the data terminal 10 and scanning head 12 when the scanning head 12 is removed from the data terminal 10 so as to describe the manner in which the scanning head 12 is removable and reversible for both left-handed and right-handed operation.

Figure 4:
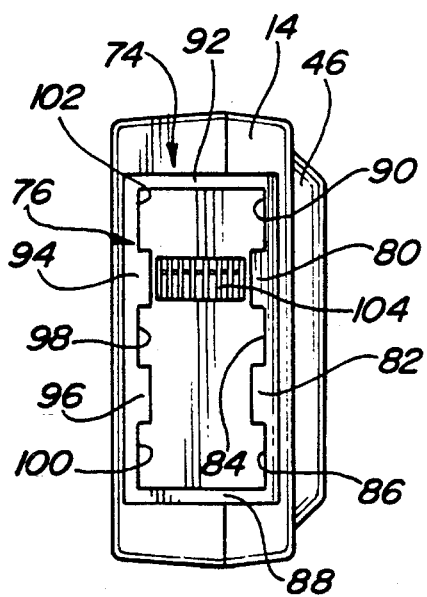
FIG. 4 is a top plan view of the data terminal of FIG. 1 with the scanning head removed.

FIG. 4 shows a top plan view of the data terminal 10 with the scanning head 12 removed to expose the top panel 14 and a securing structure 74. The securing structure 74 includes a raised rectangular edge member 76 secured to the top panel 14. Two front tab members 80 and 82 extend toward an inner area of the rectangular edge member 76 at a front side of the edge member 76. In this configuration, a slot 84 is defined between the tab members 80 and 82, a slot 86 is defined between the tab member 82 and a left end section 88 of the rectangular member 76, and a slot 90 is defined between the tab member 80 and a right end section 92 of the edge member 76. Two back tab members 94 and 96 extend toward the inner area of the edge member 76 at a back side of the edge member 76. A slot 98 is defined between the tab members 94 and 96, a slot 100 is defined between the tab member 96 and the left end section 88, and a slot 102 is defined between the tab member 94 and the right end section 92. The tab members 80, 82, 94 and 96 are raised on the edge member 76 so that a groove area is defined between each of the tab members 80, 82, 94, 96 and the top panel 14. A series of parallel spring-biased electrical connectors 104 extend through the top panel 14 between the tab members 80 and 94, as shown.

FIG. 5 shows a bottom, plan view of the scanning head 12 exposing a securing structure 108. The securing structure 108 includes a raised rectangular edge member 110 extending from a bottom panel 112 of the scanning head 12. Two tab members 114 and 116 extend from the edge member 110 away from an interior area of the edge member 110 at one side. In this configuration, a slot 118 is defined between the tab members 114 and 116, and a slot 120 is defined adjacent to the tab member 116 and opposite to the slot 118. Two tab members 122 and 124 extend from the edge member 110 away from the interior area of the edge member 110 at an opposite side, as shown. A slot 126 is defined between the tab members 122 and 124, and a slot 128 is defined adjacent to the tab member 124 and opposite to the slot 126, as shown. A series of right-handed parallel electrical connectors 130 extend through the bottom panel 112 between the tab members 114 and 122 and the slots 118 and 126. Additionally, a series of left-handed parallel electrical connectors 132 extend through the bottom panel 112 between the tab members 116 and 124 and the slots 120 and 128.

In one embodiment, the housing 16 is formed of a front half 140 and a back half 142. The two halves 140 and 142 are two injection molded plastic parts that are secured together by screws (not shown) or other suitable fastening mechanisms. In this embodiment, a front half of the connecting structure 74 is integrally molded as part of the front half 140, and a back half of the connecting structure 74 is integrally molded as part of the back half 142. Likewise, the scanning head 12 is formed of two injection molded halves 144 and 146 that are secured together by screws (not shown) or the like in which one half of the connecting structure 108 is integrally molded with the half 144 of the scanning head 12, and a second half of the connecting structure 108 is integrally molded with the other half 146 of the scanning head 12.

Figure 7:
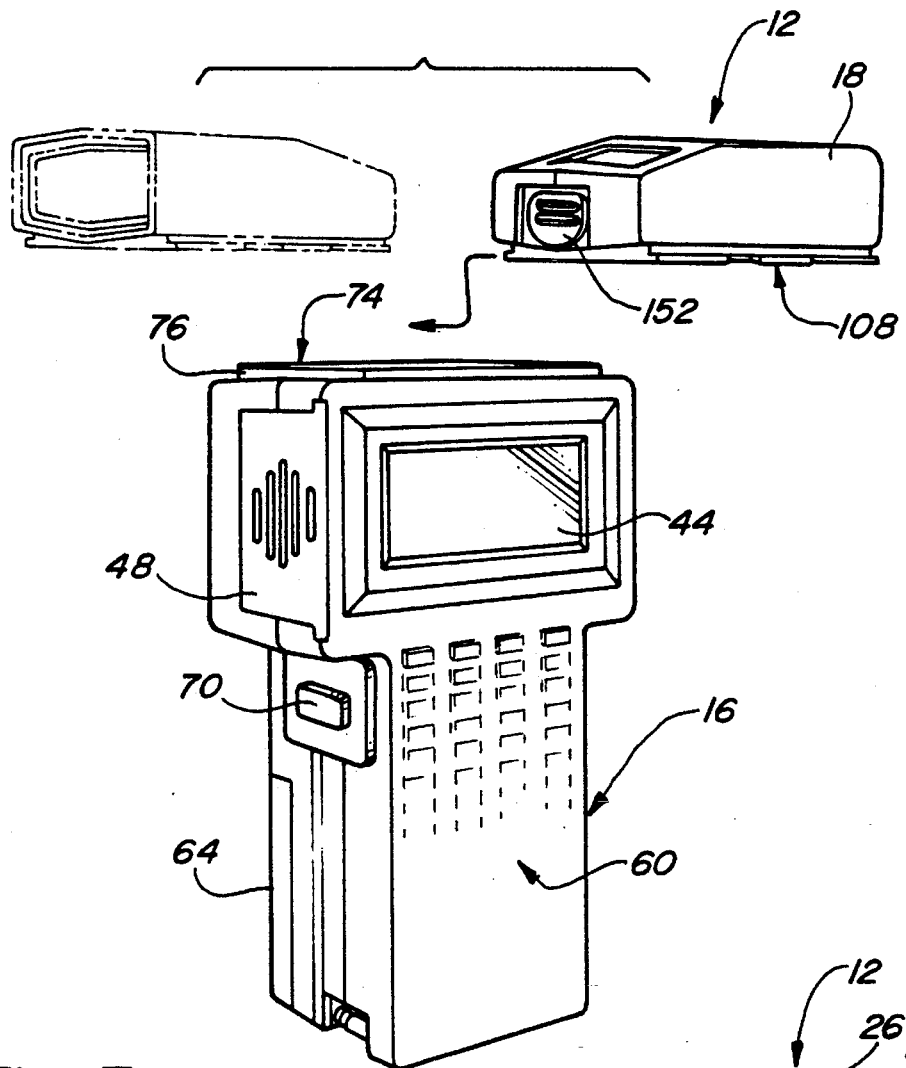
FIG. 7 is another perspective view of the portable data terminal of FIG. 1 showing the scanning head removed from the terminal for left-handed operation and in phantom for right-handed operation.
Figure 8:
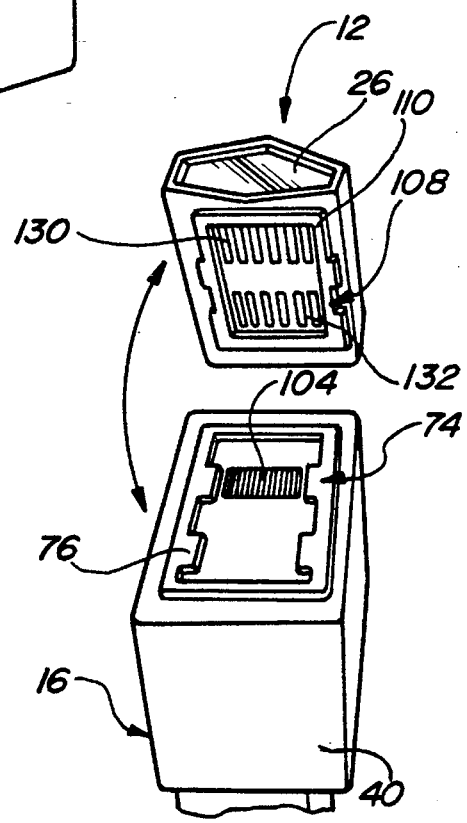
FIG. 8 is a perspective view of a top portion of the terminal of FIG. 1 showing the scanning head removed.

The connecting structure 74 secured to the top panel 14 of the scanning head 12 and the connecting structure 108 secured to the bottom panel 112 of the scanning head 12 provide a mechanism for securing the scanning head 12 to the terminal 10 in both a right-handed and a left-handed orientation. FIG. 7 shows the scanning head 12 separated from the data terminal 10 for left-handed operation, and right-handed operation in phantom. FIG. 8 shows a side perspective view of the scanning head 12 relative to the terminal 10.

To secure the scanning head 12 to the terminal 10 for right-handed orientation, the tab member 114 is positioned between the tab member 94 and the end section 92 within the slot 102, the tab member 94 is positioned between the tab members 114 and 116 within the slot 118, the tab member 116 is positioned between the tab members 94 and 96 within the slot 98, and the tab member 96 is positioned adjacent to the tab member 116 within the slot 120. Likewise, the tab member 122 is positioned between the tab member 80 and the end section 92 within the slot 90, the tab member 80 is positioned between the tab members 122 and 124 within the slot 126, the tab member 124 is positioned between the tab members 80 and 82 within the slot 84, and the tab member 82 is positioned adjacent to the tab member 124 within the slot 128.

By applying downward pressure on the scanning head 12 towards the top panel 14, and sliding the scanning unit 12 towards the left end section 88 of the edge member 76 until the edge member 110 contacts the left end section 88, the tab member 114 will be positioned between the tab member 94 and the top panel 14, the tab member 116 will be positioned between the tab member 96 and the top panel 14, the tab member 122 will be positioned between the tab member 80 and the top panel 14, and the tab member 124 will be positioned between the tab member 82 and the top panel 14 in a locking engagement. Further, the right-handed electrical contacts 130 will be in contact with the data terminal electrical contacts 104 to provide the necessary connections between the scanning head 12 and the terminal 10.

To secure the scanning head 12 to the terminal 10 for left-handed operation, the tab member 114 is positioned between the tab member 82 and the end section 88 within the slot 86, the tab member 82 is positioned between the tab members 114 and 116 within the slot 118, the tab member 116 is positioned between the tab members 80 and 82 within the slot 84, and the tab member 80 is positioned adjacent to the tab member 116 within the slot 120. Likewise, the tab member 122 is positioned between the tab member 96 and the end section 88 within the slot 100, the tab member 96 is positioned between the tab members 122 and 124 within the slot 126, the tab member 124 is positioned between the tab members 94 and 96 within the slot 98, and the tab member 94 is positioned adjacent to the tab member 124 within the slot 128.

By applying downward pressure on the scanning head 12 towards the top panel 14, and sliding the scanning unit 12 towards the right end section 92 until the edge member 110 contacts the right end section 92, the tab member 122 will be positioned between the tab member 96 and the top panel 14, the tab member 124 will be positioned between the tab member 94 and the top panel 14, the tab member 114 will be positioned between the tab member 82 and the top panel 14, and the tab member 116 will be positioned between the tab member 80 and the top panel 14 in a locked configuration. In this configuration, the left-handed electrical terminals 132 will contact the data terminal electrical contacts 104 to provide the necessary connections between the scanning head 12 and the terminal 10.

The scanning head 12 includes a locking member 150 for locking the scanning head 12 to the data terminal 10 for both the left-handed and right-handed orientations. The locking member 150 includes a rotatable locking plate 152 that is positioned relative to a back panel 154 of the scanning head 12. When the scanning head 12 is secured to the data terminal 10 in either the right-handed or left-handed orientation as discussed above, and the locking plate 152 is rotated to the position as shown in FIG. 6, a locking tab 156 is moved down to contact an inner surface of either of the end sections 88 or 92 depending on the orientation of the scanning head 12. In this locked configuration, the scanning head 12 is prevented from being slid backwards to remove the scanning head 12 from the data terminal 10. A light emitting diode (LED) 158 is positioned in the back panel 154 to provide an indication to the operator of when the data terminal 10 is reading a bar code during use.

The embodiments discussed above and shown in the figures disclose a locking tab and slot configuration including four interlocking tabs on the scanning head 12 and the top panel 14. However, as will be appreciated by those skilled in the art, any reasonable number of interlocking tab members of this type can be incorporated. For example, the scanning head 12 can include a single tab member on opposite sides of the edge member 110, and the top panel 14 can include a corresponding tab member on each side of the edge member 76 for the left-handed and right-handed orientations. Further, other types of known mechanical locking configurations commensurate with the tab and slot configuration as discussed can also be utilized within the scope of the present invention.

The removable and rotatable scanning head 12 provides a number of advantages not found in the prior art. For example, because all of the optical components of the data terminal 10 are located in the scanning unit 12, the scanning unit 12 can be removed and replaced with back-up scanning units when the components of an original scanning unit need service or repair. Further, the scanning unit 12 can be removed and replaced with different scanning units that may offer more or less scanning capabilities, such as longer range scanning, etc. Also, the manner in which the scanning unit 12 is switched from left-handed to right-handed, vice versa, orientations provides an easy and effective configuration for different operators to use the data terminal 10.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A portable scanning terminal comprising:
   a terminal housing including a top panel, said top panel including a slot and tab structure and at least one electrical contact; and
   a scanning head that emits a radiation beam in a predetermined direction relative to the scanning head, said scanning head including a scanning head housing having a bottom panel, said bottom panel including a tab and slot structure and at least one electrical contact, wherein the slot and tab structure of the top panel of the terminal housing and the tab and slot structure of the scanning head are configured to secure the scanning head to the terminal housing in a first orientation such that the at least one electrical contact of the scanning head is electrically connected to the at least one electrical contact of the terminal housing, and wherein the slot and tab structure of the top panel of the terminal housing and the tab and slot structure of the scanning head are also configured to secure the scanning head to the terminal housing in a second orientation such that the at least one electrical contact of the scanning head is electrically connected to the at least one electrical contact of the terminal housing, said first orientation being opposite to the second orientation, said scanning head further including a locking mechanism, said locking mechanism operable to lock the scanning head to the terminal housing when the scanning head is in the first orientation and the second orientation.

2. The terminal according to claim 1 wherein the slot and tab structure of the top panel of the terminal housing includes a raised edge member extending from the top panel and at least one tab member directed toward an interior area of the edge member, and wherein the tab and slot structure of the scanning head includes a raised edge member including at least one tab member directed away from an interior area of the scanning head edge member, said edge member of the scanning head being positioned within the edge member of the top panel in a position where the at least one tab member of the slot and tab structure of the top panel is positioned adjacent to the at least one tab member of the tab and slot structure of the scanning head, and wherein downward and sliding pressure on the scanning head causes the at least one tab member of tab and slot structure of the scanning head to be positioned between the at least one tab member of the slot and tab structure of the top panel and the top panel in a locking engagement.

3. The terminal according to claim 2 further comprising a locking mechanism, said locking mechanism operable to prevent the scanning head from sliding relative to the terminal housing when the at least one tab member of the tab and slot structure of the scanning head is positioned between the at least one tab member of the slot and tab structure of the top panel and the top panel.

4. The terminal according to claim 2 wherein the slot and tab structure of the terminal housing includes four tab members and the tab and slot structure of the scanning head includes four tab members.

5. The terminal according to claim 1 wherein the terminal housing further includes a keyboard positioned on a front panel of the terminal housing, a first trigger positioned on a left-side panel of the terminal housing and a second trigger positioned on a right-side panel of the terminal housing, said scanning head including a scanning window that emits a radiation beam from the scanning window upon activation of one of the first and second triggers, said scanning head being oriented so that the scanning window faces toward the left side of the terminal housing in the first orientation and the scanning head being oriented so that the scanning window faces the right-side of the terminal housing in the second orientation.

6. The terminal according to claim 5 further comprising means for preventing activation of one of either the first trigger and the second trigger.

7. The terminal according to claim 1 wherein the at least one electrical contact of the scanning head is a first and second series of electrical contacts, and wherein the at least one electrical contact of the terminal housing contacts the first series of electrical contacts when the scanning head is in the first orientation and the at least one electrical contact of the terminal housing contacts the second electrical contact when the scanning head is in the second orientation.

8. The terminal according to claim 1 wherein the terminal housing includes at least one integrally molded plastic part and the scanning head housing includes at least one integrally molded plastic part, wherein the slot and tab structure of the terminal housing is integrally molded with the at least one plastic part of the terminal housing, and the tab and slot structure of the scanning head is integrally molded with the at least one plastic part of the scanning head.

9. A portable scanning terminal comprising:
   a terminal housing including a terminal housing connecting mechanism and at least one electrical contact; and
   a scanning unit including a scanning unit housing and a scanning unit window, said scanning unit further including a radiation beam generating device for generating a radiation beam to be directed out of the window and a photosensitive device responsive to radiation being emitted into the window, said scanning unit housing including a scanning unit connecting mechanism, said scanning unit connecting mechanism being removably connectable to the terminal housing connecting mechanism so that the scanning unit is connectable to the terminal housing in a first orientation and connectable to the terminal housing in a second orientation, said terminal housing connecting mechanism being a slot and tab structure and said scanning unit connecting mechanism being a tab and slot structure, wherein the slot and tab structure of the terminal housing includes a raised edge member extending from the top panel and a plurality of tab members directed toward an interior area of the rectangular edge member, and wherein the tab and slot structure of the scanning unit includes a raised edge member including a plurality of tab members directed away from an interior of the scanning unit edge member, said edge member of the scanning unit being positioned within the edge member of the top panel in a position where the tab members of the slot and tab structure of the top panel are positioned adjacent to the tab members of the tab and slot structure of the scanning unit, and wherein downward and sliding pressure on the scanning unit causes the tab members of the tab and slot structure of the scanning unit to be positioned beneath the tab members of the slot and tab structure of the top panel in a locking engagement.

10. The terminal according to claim 9 wherein the terminal housing includes a molded plastic part, said terminal housing connecting mechanism being integrally molded with the molded plastic part of the terminal housing, and wherein the scanning unit housing includes a molded plastic part, said scanning unit connecting mechanism being integrally molded with the scanning unit housing molded plastic part.

11. The terminal according to claim 9 further comprising a left-handed trigger for activating the beam generating device and a right-handed trigger for activating the beam generating device, said right-handed trigger extending from a left side panel of the terminal housing to be positioned for activation when the scanning unit is in the first orientation, and said left-handed trigger extending from a right side panel of the terminal housing to be positioned for activation when the scanning unit is in the second orientation.

12. The terminal according to claim 9 wherein the scanning unit includes a first series of electrical contacts and a second series of electrical contacts, said at least one electrical contact of the terminal housing being electrically connected to the first set of electrical contacts of the scanning unit when the scanning unit is in the first orientation, and wherein the at least one electrical contact of the terminal housing being in electrical contact with the second set of electrical contacts of the scanning unit when the scanning unit is in the second orientation.

13. The terminal according to claim 9 wherein the scanning unit includes a locking mechanism, said locking mechanism operable to lock the scanning unit to the terminal housing when the scanning unit is in the first orientation and the second orientation.

14. A scanning terminal comprising:

a terminal housing including a terminal housing connecting mechanism and a series of terminal electrical contacts; and a scanning unit including a scanning unit housing, said scanning unit housing including a scanning unit connecting mechanism, said scanning unit connecting mechanism being removably connectable to the terminal housing connecting mechanism so that the scanning unit is connectable to the terminal housing in a first orientation and connectable to the terminal housing in a second orientation, said scanning unit including a first series of electrical contacts and a second series of electrical contacts, wherein the first series of electrical contacts of the scanning unit are electrically connected to the series of electrical contacts of the terminal housing when the scanning unit is in the first orientation and the second series of electrical contacts of the scanning unit are connected to the series of electrical contacts of the terminal housing when the scanning unit is in the second orientation, said terminal housing connecting mechanism being a slot and tab structure and the scanning unit connecting mechanism being a tab and slot structure, wherein the slot and tab structure of the terminal housing includes a raised edge member extending from the top panel and a plurality of tab members directed toward an interior area of the rectangular edge member, and wherein the tab and slot structure of the scanning unit includes a raised edge member including a plurality of tab members directed away from an interior of the scanning unit edge member, said edge member of the scanning unit being positioned within the edge member of the top panel in a position where the tab members of the slot and tab structure of the top panel are positioned adjacent to the tab members of the tab and slot structure of the scanning unit, and wherein downward and sliding pressure on the scanning unit causes the tab members of the tab and slot structure of the scanning unit to be positioned beneath the tab members of the slot and tab structure of the top panel in a locking engagement.

15. The terminal according to claim 14 wherein the terminal housing connecting mechanism is a plastic part integrally molded with the terminal housing and the scanning unit connecting mechanism is a plastic part integrally molded with the scanning unit housing.

16. The terminal according to claim 14 further comprising a left-handed trigger and a right-handed trigger, said left-handed trigger extending from a right side panel of the terminal housing to be positioned for activation when the scanning unit is in the first orientation, and said right-handed trigger extending from a left side panel of the terminal housing to be positioned for activation when the scanning unit is in the second orientation.

17. The terminal according to claim 14 wherein the scanning unit includes a locking mechanism, said locking mechanism operable to lock the scanning unit to the terminal housing when the scanning unit is in the first orientation and the second orientation.

* * * * *